United States Patent [19]

Park et al.

[11] 4,267,243

[45] May 12, 1981

[54] BIPOLAR STORAGE BATTERY OF EXTENDED SURFACE ELECTRODE TYPE

[76] Inventors: Robert H. Park, 1510 W. Demeter Dr., Freeport, Ill. 61032; Clark A. Waage, 477 B Buckingham Dr., Lakehurst, N.J. 08733

[21] Appl. No.: 133,561

[22] Filed: Mar. 24, 1980

Related U.S. Application Data

[63] Continuation-in-part of Ser. No. 958,122, Nov. 6, 1978, abandoned, and Ser. No. 908,447, May 22, 1978.

[51] Int. Cl.³ .................... H01M 10/30; H01M 2/26
[52] U.S. Cl. .................................. 429/136; 429/154; 429/160; 429/161
[58] Field of Search ............... 429/149, 161, 160, 152, 429/73, 82, 153, 154, 155, 136

[56] References Cited

U.S. PATENT DOCUMENTS

| 618,247 | 1/1899 | Dolter | 429/155 |
|---|---|---|---|
| 1,506,278 | 8/1924 | Sturges | 429/154 |
| 1,712,897 | 5/1929 | Morrison | 429/149 |
| 3,003,011 | 10/1961 | Artajo | 429/160 |
| 3,546,023 | 12/1970 | Halter et al. | 429/73 |
| 3,795,543 | 3/1974 | Poe | 429/160 |

FOREIGN PATENT DOCUMENTS

76,941  12/1916  Switzerland ............................. 429/149

*Primary Examiner*—Donald L. Walton
*Attorney, Agent, or Firm*—John A. Shedden

[57] ABSTRACT

There is disclosed a long life light weight alkaline storage battery taking the form of a two terminal linear array of cells, the sidewalls, tops and bottom portions of which comprise a pair of molded plastic frames of substantially rectangular section which are joined together in a leak proof manner, with each pair similarly joined to either a similar pair, or to an end frame, while the tube of substantially rectangular sections so formed is compartmented by a series of nickel or nickel plated steel end plates that are entered into the joints between frame pairs during assembly, and that, except in the case of outermost cells, have folded dual porous plate type electrodes, impregnated to be of opposite polarity welded to their opposite sides in such manner that they project perpendicularly from the surface of the end plates to which they are attached and possessing tapered leading edges with the foremost edge unimpregnated to facilitate assembly, there being provision so that, in the assembled battery, within each cell the positive and negative electrodes that are attached to adjacent cell end plates are interleaved, though prevented from contact by separator material, while provision is made so that the outer surfaces of the two outermost cell end plates make electrical connection to battery terminals.

10 Claims, 7 Drawing Figures

BIPOLAR STORAGE BATTERY OF EXTENDED SURFACE ELECTRODE TYPE

RELATED U.S. APPLICATIONS

This application is a continuation-in-part application of Ser. No. 958,122 which was filed Nov. 6, 1978 now abandoned. Copending application, Ser. No. 908,447 was filed May 22, 1978.

Field of the Invention

The invention relates to light weight, alkaline storage batteries, which because of a unique design combining greater electrode surface area exposure per unit volume; shortened current travel path; and minimum heat transfer resistance, permits longer life than those under similarly severe charge/discharge cycles.

BACKGROUND OF THE INVENTION

The search continues for storage batteries that are compact, light in weight and have the ability to accept numerous rapid, high current charge and discharge cycles.

In conventional storage batteries of the type that have heretofore represented articles of commerce, when the battery is being charged, current enters a group of positive electrodes through a positive terminal that connects to tabs that make connection to a corner of each electrode. The current thereafter flows in part away from the electrode corner through the conducting material of the electrode, and, in part through the cell's electrolyte, and an electrode separator, to its negative electrodes and, from its points of entry, to a corner of these electrodes, and next through a group of electrode tabs to the tabs of the positive electrodes of the next cell and so continues until the current has passed through all series connected cells. While on discharge, of course, the current flows in the reverse direction. This excessively long current travel path results in undesirable heat generation which often requires secondary cooling means to keep the temperatures within the battery within acceptable limits. Especially under high current charging conditions, failure to dissipate this heat energy can shorten battery life significantly for a number of reasons such as buckling of the plates, deterioration of separators, local chemical action in the plates, etc.

The bipolar battery which has a much shorter current path through each cell and from cell to cell was developed in an attempt to lessen the internal heat energy generation problem described above. When the bipolar battery is being charged, the current flows from a positive terminal to a first metal plate, the far side of which represents a positive electrode, and next flows in a straight short path through the electrolyte and a separator, to another metal plate the near side of which constitutes a negative electrode, and the far side an electrode of positive type, and, in this way, flows progressively in a straight line until the negative terminal of the battery is reached.

Hence the flow path is short and the internal resistance and therefore internal heat generation of the bipolar battery is for a given current flow significantly lower than that of the intitially described, conventional type battery.

A paper entitled "Lead Acid Battery for Multisecond Pulse Discharge" by Biddick et al (Proc. Eleventh Intersociety Energy Conversion Engineering Conference, August 1968 Vol. 1, pp. 47-51) and British Patent No. 226,857 describe lead acid batteries of the bipolar type taking the form of a series of lead sheets separated at the edges by rubber washers, the space so formed incorporating a separator and being substantially filled with the type of electrolyte customarily employed in lead acid cells. The storage capability is obtained by the process of plate formation used in the manufacture of Plante type cells.

Two main, albeit interrelated, difficulties have hindered practical use of the bipolar batteries in long life, high capacity charge/discharge cycle situations.

The first is that in the vertical plane perpendicular to the current flow, the active surface of the electrodes have been limited to the external surface only and therefore, to obtain sufficiently exposed area of the electrodes to the electrolyte, the overall cross sectional area in this vertical plane must be large. This lack of compactness causes a severe problem vis-a-vis the removal of the internally generated heat.

A paper entitled "Bipolar Nickel-Cadmium Cells for High Energy Pulses" by Seiger et al (Proc. Intersociety Energy Conversion Engineering Conference, September 1966, pp. 271-278) describes the construction and tests of performance of small experimental sealed nickel-cadmium batteries of the bipolar electrode type, carried out for the U.S. Army Missile Command. Typical results reported by NASA in 1972 noted that with nickel-cadmium type batteries at room temperature a 25% depth discharge deterioration would occur at about 15,000 charge/discharge cycles.

"High Power Density Bipolar Lead-Acid Battery for Electric Vehicle Propulsion" by Kassekert et al (Proc. Eleventh Intersociety Energy Conversion Engineering Conference, September 1966, Vol. 1, pp. 411-417) describes an approach to a solution to the problems of heat removal from lead acid type bipolar batteries through employment of cell cooling effected by recirculating electrolyte through a heat absorption unit, i.e., via a secondary cooling means. (Our invention makes it possible to do away with provisions to recirculate and exteriorly cool the electrolyte.)

U.S. Pat. No. 3,003,011 to Artajo describes a bipolar type storage battery wherein all the plate forming elements of a polarity in one cell are formed of one piece of metal and are in interdigitated relationship. Furthermore, said plate forming elements are each looped or folded and intermittantly bonded in the loop and to a metal end plate. Each plate forming element is provided thereby with undulations on its opposite sides to form a series of substantially separate chambers or pockets into which is subsequently introduced an electrochemically active paste. The folded metal of the plate forming element is perforated to allow for electrical activity to occur at the surface of the paste filled holes.

The patent discloses that an important advantage of this design resides in the fact that "between the exothermic chemical reactions on one plate and the endothermic reactions on the other, a compensation of heat will take place through the metal, and not through the electrolyte, as occurs in the conventional type of battery." (Col. 3, lines 58-62)

Artejo is obviously more concerned about the internal heat created by the exothermic chemical reaction than that generated by current flow, i.e., he doesn't address the problem of dissipation of the internally generated heat resulting from a rapid high current charge/discharge situation. Furthermore, inherent in the Artejo design is not only the limited active life of paste type batteries as a result of the dissolution of the paste in the electrolyte, but, in addition, the limited active electrode exposure area, i.e., that area of the paste surface in contact with the plate element perforations. Additionally, by using a continuous strip of metal to (1) loop to form two sides of a plate element and (2) interconnect each plate element, Artejo has created a metal loaded system which if produced on a scale of sufficient size to power for example a passenger vehicle, would as a result of the above three inefficiencies lack compactness and be unnecessarily heavy—both disadvantages that would curtail its practical usefulness.

The instant invention produces a long life, light weight storage battery which overcomes the above-identified problems of the prior art.

An object of the invention is to provide an alkaline storage battery which has a greatly increased active electrode surface area per unit of battery cross sectional area in a plane perpendicular to the current flow with attendant compactness. As a result of this unique design, rapid dissipation of large current induced, internal heat generation without secondary cooling means is realized.

Finally, it is an object of this invention to provide an advanced battery design and a unique process for constructing same wherein no gaskets or compression bolts are required.

SUMMARY OF THE INVENTION

Batteries produced in accordance with the method of this invention, which are herein termed "extended surface electrode bipolar batteries", comprise two terminal structurally integrated linear arrays of alkaline cells, each of which takes the form of a pair of nickel or nickel-plated steel cell end plates, separated by molded plastic cell bodies.

Except in the case of end cells, each cell end plate serves as the mechanical support and current collector to which folded, dual porous plate type electrode, positive on one side, and negative on the other, are welded in one operation, a feature which eliminates the losses inherent in conventional batteries in which each cell has a pair of terminals and a corner of each electrode is welded to one of these terminals.

The treatment of the outermost end plates of end cells is different in that while electrodes are attached to the inner side, the outer side makes connection to nickel-plated steel strips which, in turn, connect to battery terminal posts.

Inside of each cell, positive and negative electrodes are interleaved, while woven nylon or other suitable material is made use of as a separator to prevent electrical shorting.

Cells can be provided with an auxiliary terminal. Optionally, each cell may also be equipped with a pressure relief type vent. However, in the event that those cell end plates having electrodes welded to both sides are perforated at a point sufficiently above normal electrolyte level, use of a single pressure relief type vent per battery suffices. Basically, the object of the invention is to produce a low cost long life, light weight alkaline battery which can be of the nickel cadmium, or other porous metal type.

The instant design enables one to employ a limited cell width in a direction perpendicular to the plane of the electrodes yet realize large active electrode area contact with the electrolyte. As a result, the problem of heat dissipation can be adequately dealt with, and the need for circulation of a coolant liquid to maintain proper temperature eliminated.

DETAILED DESCRIPTION

Although the invention will be described specifically with reference to a nickel-cadmium secondary cell reaction system, this is merely for illustrative purposes—the cell design being equally applicable to other "alkaline" cell systems.

In the nickel-cadmium secondary battery, when the cell is in the uncharged condition, the positive electrode is nickel (II) hydroxide and the negative cadmium hydroxide. In the charge condition the positive electrode is nickel (III) hydroxide, the negative metallic cadmium. The electrolyte is potassium hydroxide. The average operating voltage of a single cell under normal discharge conditions is about 1.2 volts.

Figure 1:
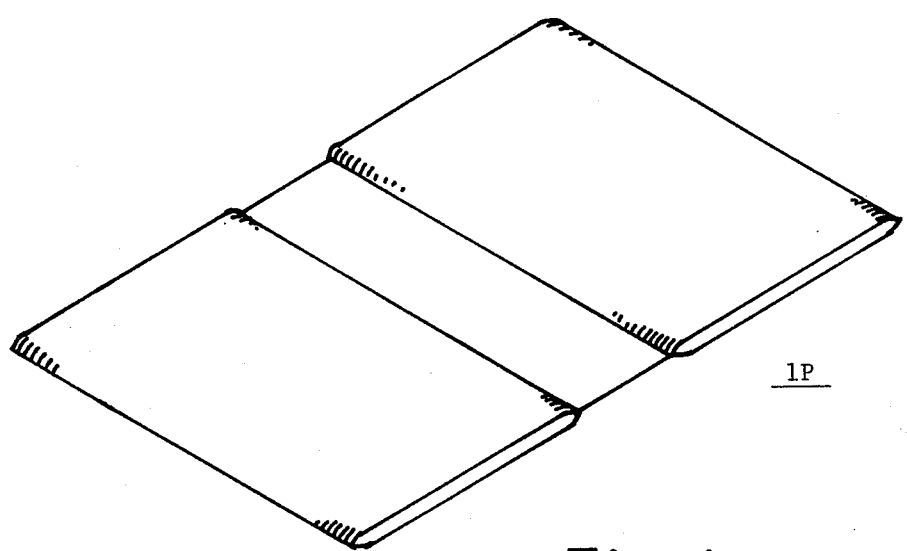
FIG. 1, Shows a flat flexible dual electrode.

Referring to FIG. 1, item 1P therein, which will be referred to as a "flat dual electrode of positive polarity" takes the form of a centrally located, unperforated area, of thin nickel or nickel-plated steel sheet—which will be referred to as the "channel base"—from which, it is to be understood, there extend on either side, perforated areas of the same sheet which have been coated equally on both sides with a sintered-on layer of porous nickel preferably having two opposed tapered edges, with more preferably a small strip of non-porous bare metal exposed, after which the porous nickel has been impregnated with active materials adapted to confer positive electrode polarity.

Figure 2:
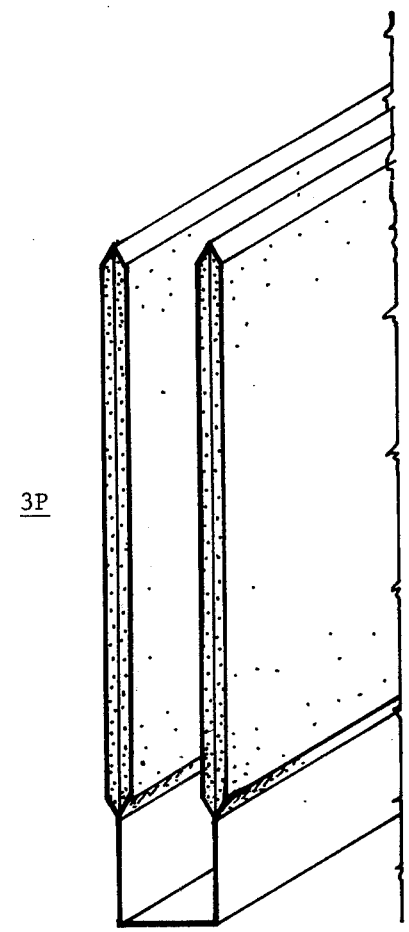
FIG. 2, Shows a formed dual electrode. In a preferred embodiment, the leading edges are tapered to facilitate assembly. In a more preferred embodiment, each tapered leading edge has a bare, non-perforated strip of metal exposed. Note the "U" shaped channel base.

FIG. 2 shows, as item 3P, a sectional view of what will be termed a "formed dual electrode of positive polarity", which has been produced by bending an item 1P into the configuration shown.

Whereas FIG. 1 and FIG. 2 show positive dual electrodes, as will be readily appreciated, the present invention will of necessity make use of flat and formed negative dual electrodes as well, which we will elect to identify by the reference characters 1N and 2N. Detailed descriptions of typical processes for constructing the high porosity ergo highly internally surface active coatings of these electrodes can be found in U.S. Pat.

Nos. 3,540,930 and 3,540,931 incorporated herein by reference.

Figure 3:
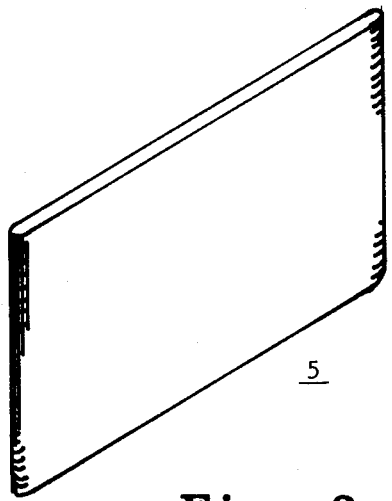
FIG. 3, Shows a nylon fabric separator.

FIG. 3 shows an electrode separator 5, which can be constructed from woven nylon or other suitable fabric or a thin, microporous, ion-permeable sheet of a material such as rubber, paper, polyethylene, polyvinyl chloride or the like and taking the form of a shallow bag capable of being made by folding the fabric and thereafter heat sealing at right angles to the fold in two places. The dimensions are so chosen that the bag approximates the dimensions of, but is slightly larger than one individual electrode of a dual electrode pair to be readily slid over and fully enclose said electrode.

Figure 4:
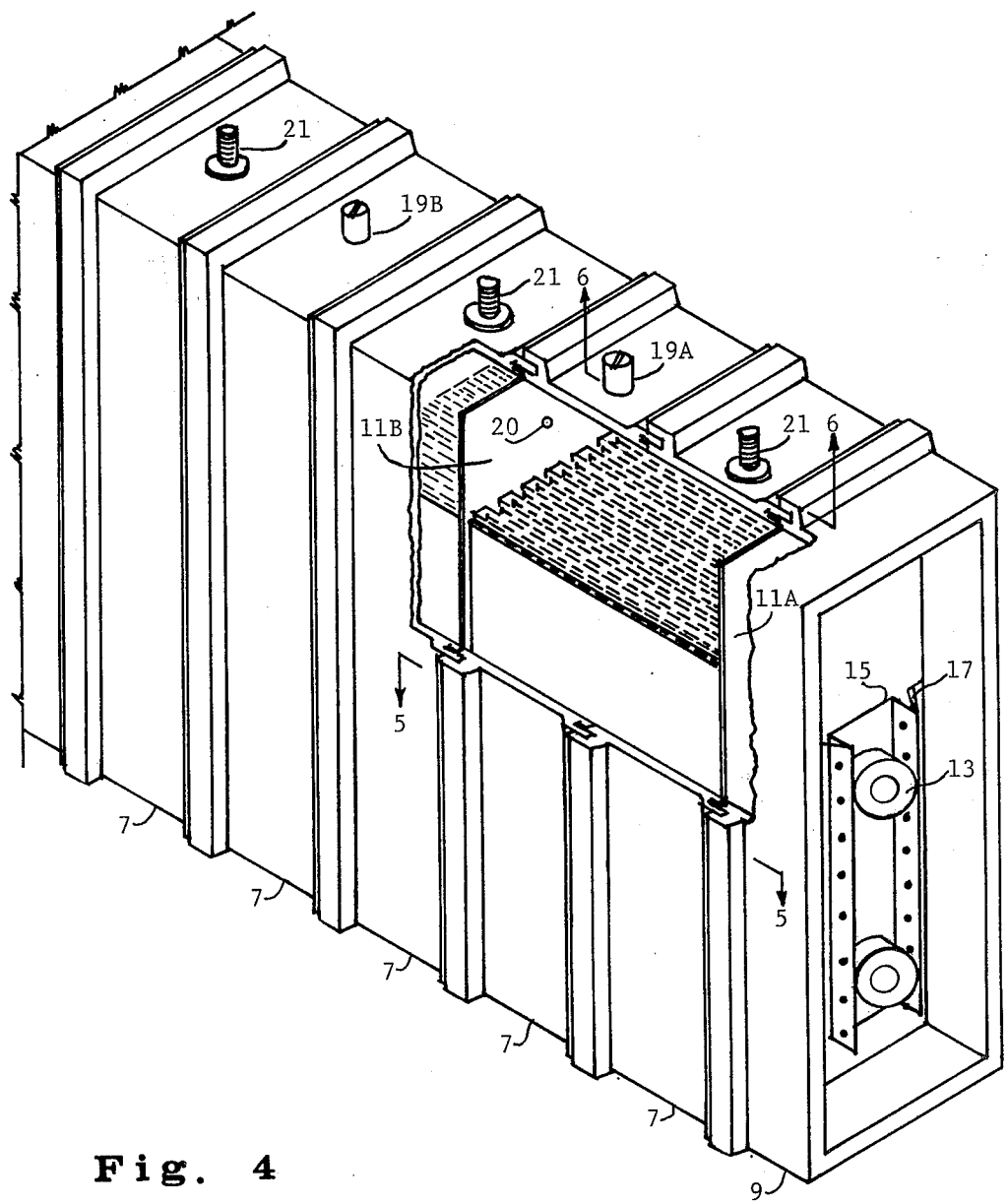
FIG. 4, Shows an oblique view of the battery, which illustrates the internal construction of a cell. Also shown are the optional externally accessible filling and/or venting means. At one end is illustrated one version of an externally accessible terminal means located on a terminal assembly. The stack of internal subassemblies and two terminal assemblies, one at each end with the additional presence of electrolyte, constitute the battery.

Referring to FIG. 4 there is shown therein a structurally integrated array of molded plastic frames of two types, namely body frames 7 and end frames 9.

As shown in FIG. 4, provision is made to allow body frames to mate, both with each other and with end frames via provision of tongue and groove joints, i.e., the body sleeves or frames are joined to like body sleeves or frames on adjacent half-cell elements to form a finished battery stack. The body sleeves preferably comprise any of a number of plastics such as polypropylene, polyethylene, polystyrene, polybutylene terephthalate, nylon and the like, as well as copolymers thereof.

Again referring to FIG. 4, items 11A and 11B represent nickel or nickel-plated steel cell end plates, the edges of which are embedded respectively in the joints between the end sleeve and the adjacent body sleeves, and between pairs of body sleeves, as more fully shown in the next figure, i.e., the end plate is sealed on its periphery to the non-conductive sleeves or frames.

In assembly air tight seals are obtained by applying to mating surfaces a suitable sealant, such as an epoxy type, which adheres both to the metal end sleeve and to the material of the plastic sleeves, which, in this connection, can advantageously take the form of nylon. Of course, it may also be advantageous to use various welding processes, such as thermal, ultrasonic, etc.

Though details are better shown in other figures, it will be noted, at this point, that item 13 comprises a pair of cell terminals which made electrical and mechanical connection with channel member 15, which, in turn, makes a similar connection to the battery's outermost cell end plate 11A via connector strips 17 that are to be understood to be spot welded both to the cell end plate and to the sides of the channel.

Again, though also better shown in other figures, it is to be understood that item 19A represents a pressure relief type cell vent and filler cap, and item 21 what we will refer to as a cell auxiliary terminal.

Item 19B can comprise either a pressure relief type filler cap, or a filler cap without pressure relief. In the latter case cell pressure equalization holes 20, must be provided in those cell end plates which have dual electrodes welded to both sides.

During the latter part of a recommended charge cycle and during overcharge, nickel-cadmium batteries generate gas. Oxygen is generated at the positive (nickel) electrode after it becomes fully charged, and hydrogen is formed at the negative (cadmium) electrode when it reaches full charge.

Conventional nickel-cadmium batteries will liberate oxygen and hydrogen plus entrained electrolyte fumes and therefore the optional provision for a vented pressure relief valve. Hermetically sealed nickel-cadmium batteries can be produced via techniques well known in the art such as constructing the battery with excess-ampere-hour capacity; and designing each cell so that the oxygen which is formed first can reach the surface of the metallic cadmium electrode where it reacts forming electrochemical equivalents of cadmium oxide.

Further, it will be noted, by examination of the figure, that the space between cell end plates 11A and 11B is shown as occupied, and it is to be understood, as will be more fully explained in other figures, that the intent of the drawings is to convey that a group of dual electrodes is attached to the next to outermost cell end plate 11B, and that, though not fully shown, another interleaved group, which would be chosen to be of opposite polarity is attached to the outermost cell end plate 11A, the net effect being to produce an assembly, which, with separators in place and after electrolyte is added, will become an end cell of the battery.

Similarly, by attaching electrodes of proper polarity to the innermost side of cell end plate 11B, and of opposite polarity to the second from outermost cell end plate, a second cell can be produced, while also this process can be continued as the battery assembly process progresses.

Because, for favorable battery performance, the spacing of individual electrodes of a formed dual electrode will tend to be of the order of 1/16 inch, with the thickness of individual electrodes less than half this dimension, it needs to be understood that in FIG. 4, in order to portray the electrodes in recognizable interleaved form, it has been necessary to show their width as constituting a greater fraction of the width of the battery than would apply in the case of an actual cell.

Figure 5:
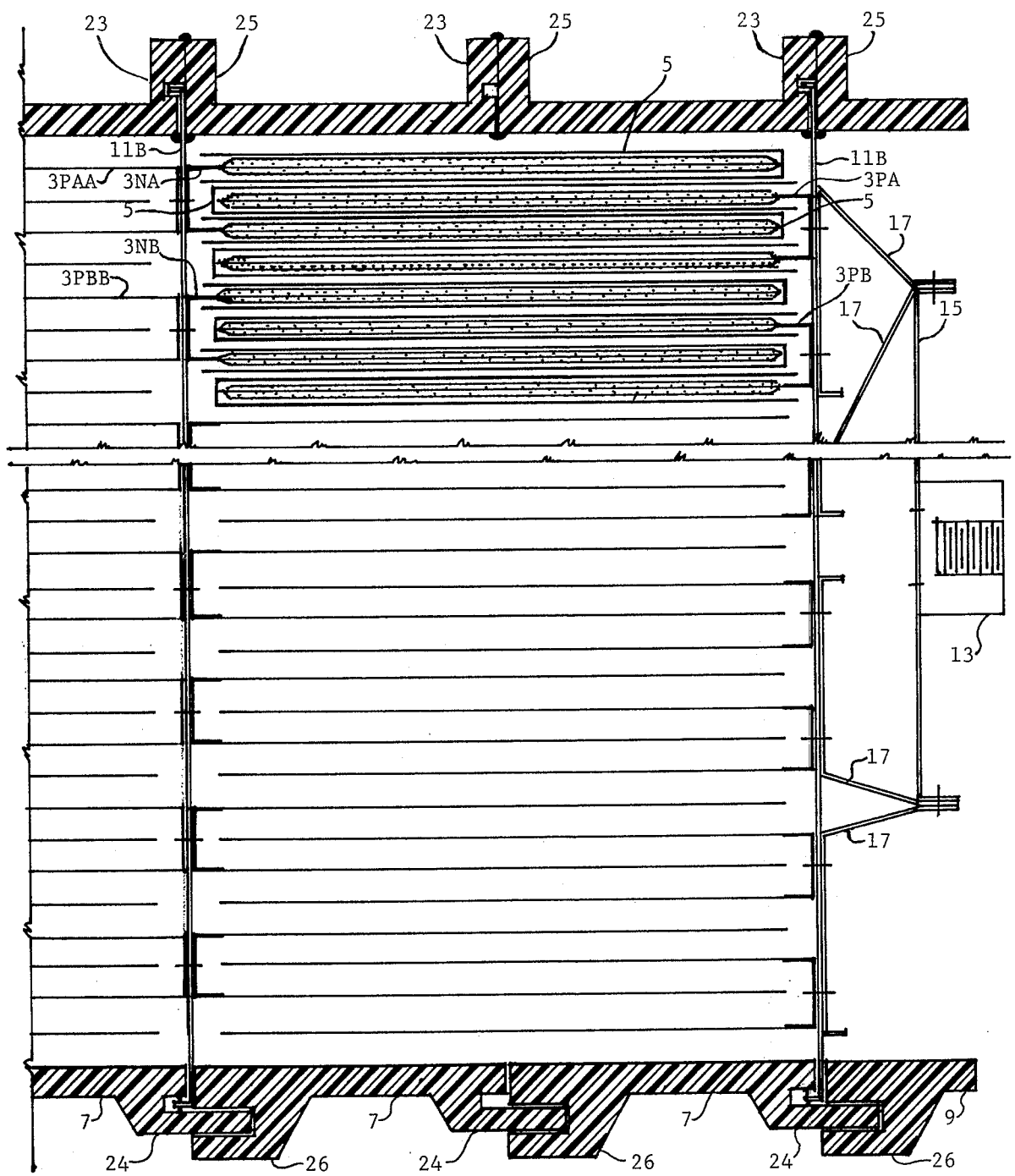
FIG. 5, Shows a sectional plan view of a portion of a battery.

Referring now to FIG. 5, which represents a plan view of a section through the arrows shown in FIG. 4, it is to be understood that the figure is still more schematic, for the same reason, and in no way represents a scale drawing, but rather is intended to help convey an understanding of the technique of attaching electrodes to cell end plates, in a manner which causes them to be interleaved and form a succession of series connected cells.

At the same time FIG. 5 shows not only the details of tongue and groove sleeve joints, 24 and 26, but in addition, shows, as an alternate to that type of sleeve design, an arrangement in which both the body and end sleeves of the battery, which we will identify as 23 and 25 respectively are provided with flanges, the intent being that the material of construction would preferably be heat sealable, and in a more preferred form would comprise an ethylene-propylene copolymer of the type that in recent years has been widely used in producing heat sealed cases for automotive starting and lighting batteries of lead-acid type.

Referring again to FIG. 5 it will be noted that positive, formed dual electrode 3PA attaches to the inside of the outermost cell end plate 11A, and negative formed dual electrodes 3NA to the outermost side of cell end plate 11B, and that each electrode is shown to be enclosed within a separator 5. Also it will be noted that the outermost cell end plate 11A makes connection to channel 15 via connector strips 17, two arrangements being shown.

Further, it is to be understood that attachment of electrodes to cell end plates is effected by means of a sequence of closely spaced spot welds and that, in assembly, electrode 3PA and one of connectors 17 are so attached, while the same applies to 3PB, and similarly in the case of other electrodes that attach to 11A In the same manner, in the case of the next to outermost cell end plate 11B, negative formed dual electrodes 3NA and a positive formed dual electrode 3PAA are to be understood to be simultaneously attached by spot welding, while the same applies to dual electrodes 3NB and 3PBB, and similarly in the case of other electrodes that attach to 11B.

Again referring to FIG. 5, it will be noted that the cell end plates shown therein are provided with turned down edges which fit into molded-in grooves in the plastic sleeves that form the sides, top, and bottom portions of the cells, an object being to assist in avoiding differential expansion of metal and plastic when cell temperature changes.

Figure 6:
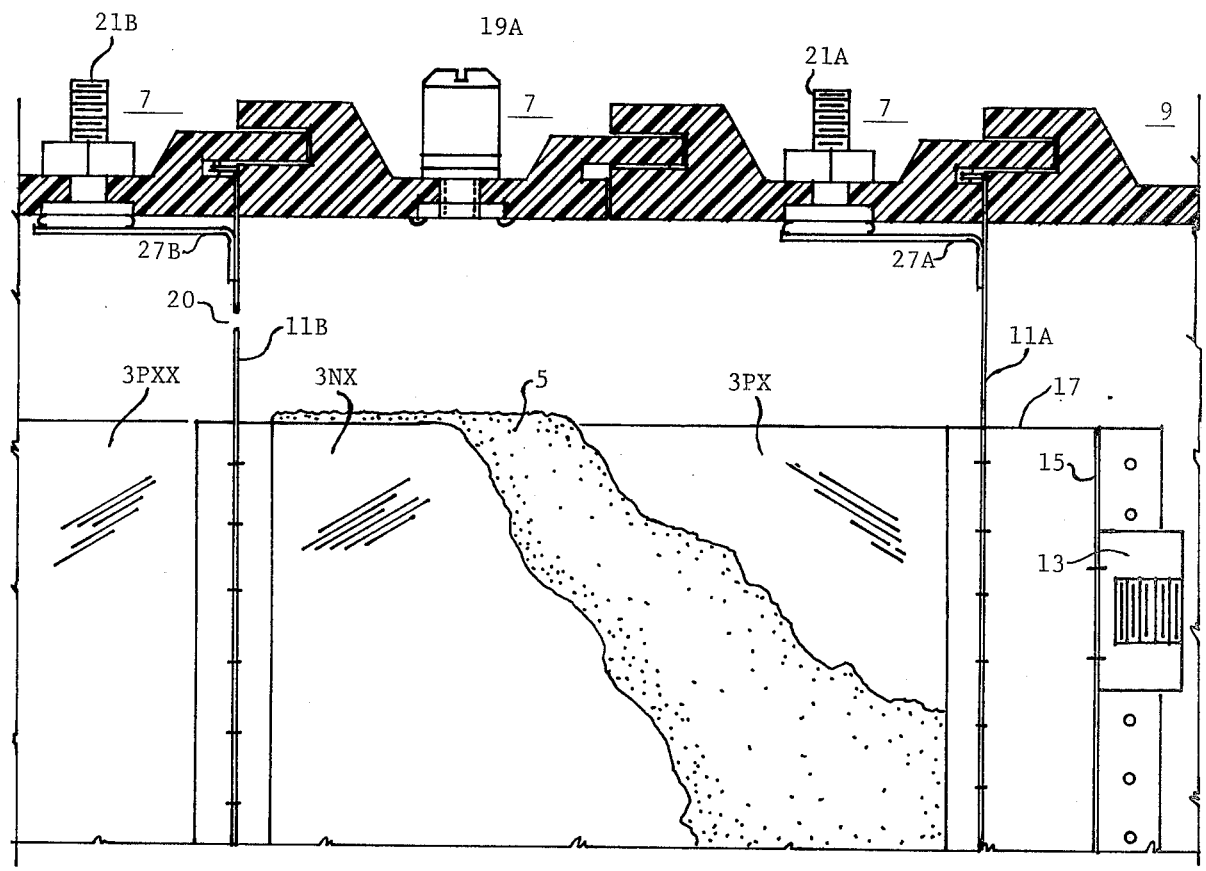
FIG. 6, Shows a vertical section through a top portion of the battery.

Referring now to FIG. 6 there is shown therein a vertical section through optional pressure relief type vent and filter cap 19A and optional auxiliary terminals 21A and 21B.

In the cutaway view half of a formed dual electrode 3NX is partially shown, separated by half of separator 5 from half of a formed dual positive electrode 3PX, while 3PX and a connector strip 17 are understood to be simultaneously spot welded to cell end plate 11A and 3NX and 3PXX to cell end plate 11B.

Pressure relief type vent and filler cap 19A is shown to be of a type widely used as a component of aircraft type nickel-cadmium batteries.

Also the drawing shows how auxiliary terminal 21A is arranged to make connection to cell end plate 11A, and auxiliary terminal 21B to cell end plate 11B, connection being achieved via connector strips 27A and 27B, which would preferably comprise nickel, or nickel-plated steel and would be spot welded in place at both ends.

Figure 7:
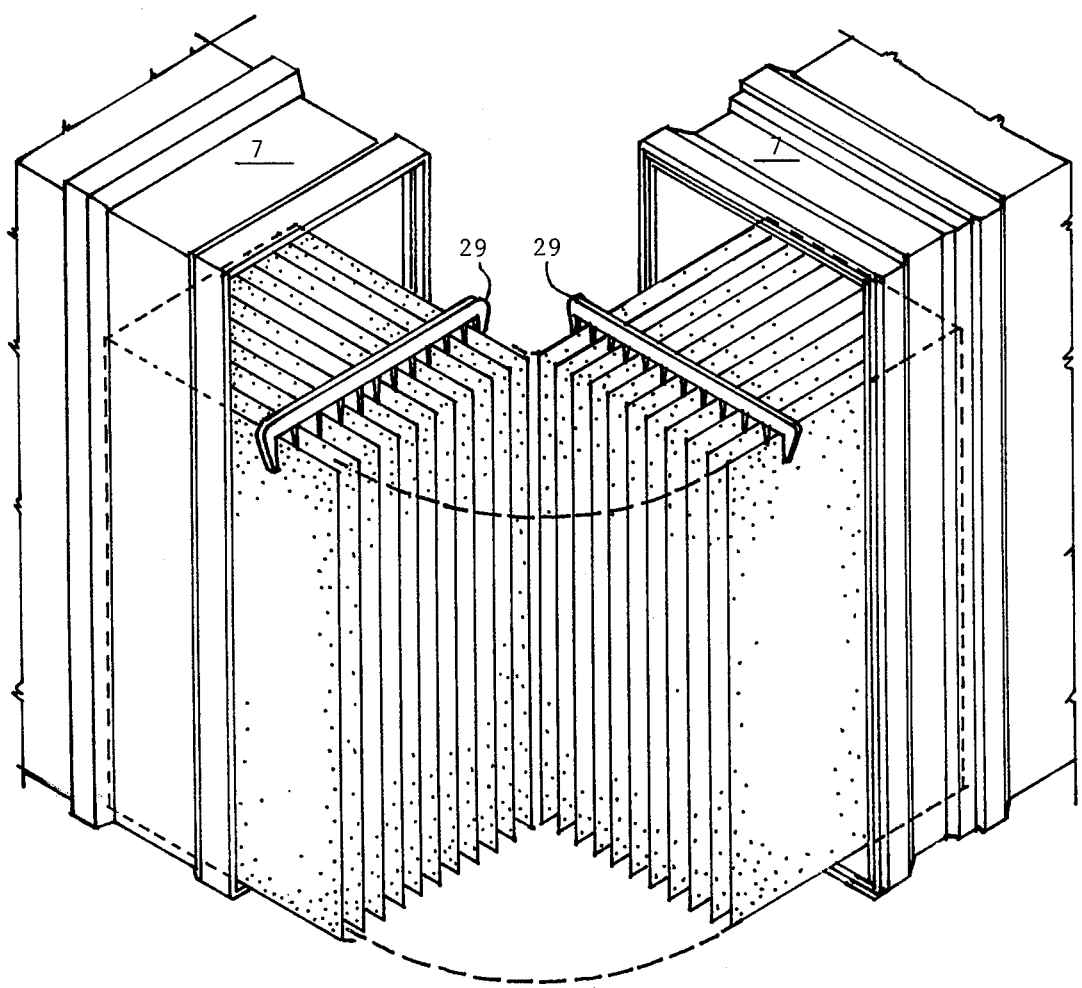
FIG. 7, Relates to the technique of cell assembly and shows two internal subassemblies being interleafed.

Referring to FIG. 7, schematic in nature, there is shown therein, how by using combs 29, the problem of interleaving positive and negative dual electrodes in battery assembly is facilitated. Though FIG. 7 does not show the construction of the electrodes other than schematically, by reference to FIG. 2 it will be apparent that the tapered edge construction shown in that figure will also operate to facilitate assembly of the mating edge, i.e., those opposed and interleaved.

The following is illustrative of the process steps utilized in the construction of a typical battery of the design of the instant invention.

(A) Folded, dual leaf electrodes are prepared as follows:
  (1) A nickel-plated steel or pure nickel strip of metal approximately 2⅜" wide by 4¾" long by 0.002" thick is perforated with 1/16" diameter holes in two areas of equal size at opposite ends of said strip—the areas being approximately 4 1/16" by 1⅛"—leaving a narrow leading edge unperforated at each end.
  (2a) A slurry of nickel oxide is applied to the two perforated areas to an average overall thickness of about 0.25". The dipped strip leading edges are shaped by a doctor blade; the strip dried; and sintered in a non-oxidizing atmosphere under elevated temperatures until the nickel oxide becomes a hard porous plaque.
  (2b) Alternately, carbonyl nickel powder is placed on either side of the perforated areas in a graphite mold and the powder sintered in a non-oxidizing atmosphere under elevated temperature and pressure until, as in 2a, a hard plaque of low apparent density is formed possessing porosities in the range of from about 60% to about 90%. It is desirable to maintain these plaques at as high a porosity as possible consistent with good mechanical strength.
  (3) The strips are then impregnated to produce negative and positive plates as described in detail in U.S. Pat. Nos. 3,540,930 and 3,540,931 respectively.
  (4) The plates are folded into dual leaf electrodes as in FIG. 2, the channel base width being approximately 1/16".
  (5) Separator sleeves of 0.0025" thick woven nylon which have been heat sealed at the edges to form envelopes approximately 1 5/16" by 5" are slipped over each side of the channel to protect and physically separate the electrode plates.

(B) End plates or barriers with electrodes attached are prepared as follows:
  (1) A 0.010 nickel-plated steel or nickel strip is cut to about 1⅝" by 5⅝" and formed into a shallow tray or pan whose inside dimensions are about 1.46" by 5.55".
  (2) A positive electrode channel base is placed along one edge of the base of the barrier and a negative electrode channel base is placed oppositely the positive electrode channel base sandwiching the barrier between them. While maintaining the positive channel base; the barrier, and the negative channel base in intimate contact, the single electrode leaf facing the unfilled barrier of both the negative and positive folded electrodes are folded away from the other leaf of identical polarity to allow insertion of welding means which will permanently affix the positive electrode channel base to the barrier to the negative electrode channel base.

Since commercial welding units capable of delivering the necessary current to weld these units—and it is desirable to have at least ten spots per channel—are water cooled, they are quite large relative to the gaps between the electrode leafs of the instant invention. Thus, the ability of one leaf of each pair to fold temporarily out of the way of the welding means is quite a unique, advantageous processing feature of this invention and permits production of extremely closely spaced plates.

(3) When ten pairs of the negative and positive folded electrodes have been welded to the end plate in a symmetrical pattern as shown in FIG. 5, the plate structures are ready for insertion into the plastic frames.

(C) Cell Assembly:
  (1) Although the specific design of the casing or frame structure for housing the plates is not critical as long as it serves the required purposes of supporting the barrier end plates; external connectors; encasing the electrolyte; etc. and, of course, be composed of an electrical insulator material, a preferred embodiment envisions entrapment of the raised edges of the barrier end plates within the connecting walls of the battery casing. Two illustrative designs are shown in FIG. 5. Note that one edge of the frame will have two female grooves; one to accept the male member of this barrier end plate, the other the male member of the other frame.

In the specific example of the instant invention, each segment of the external case is comprised of a molded nylon rectangular sleeve or frame about 5 23/32" long by 1 23/32" wide by 31/32" deep. The appropriate tongue and grooves on these frames permit a male and female engaging situation which, besides connecting said frames, entraps the barrier end plates permanently.

(2) Two identical rectangular frames interconnected with a barrier end plate in between create essentially a cell. Optionally, prior to assembly, one sleeve has had installed a combination vent and filler screw (19A). The other sleeve can optionally have installed a terminal stud to monitor the condition of the cell and/or provide electrical access to the cell of cell reversal should occur (21A).

(D) Battery Assembly:

(1) In order to mate the above-described assemblies into a completed battery, it is necessary to alternately space the positve and negative electrode leafs using comb means as depicted in FIG. 7. One of the outstanding features of the instant design, i.e., the flexibility of the dual folded electrode plates, plays an important role in enabling the battery to be assembled with relative ease.

(2) When the electrodes are properly interleaved, frame closure is made using an adhesive or suitable welding technique. In this manner, cell A is permanently attached to cell B, etc. When a sufficient number of cells are assembled, special end cells are assembled.

(E) End Cell Assembly:

(1) To produce a positive end cell, positive plates are positioned on one side of a barrier end plate and on the other side of said barrier plate, channel like conductor strips are simultaneously welded to said barrier as in FIG. 5. A negative end cell is produced similarly using negative electrode plates.

(2) To produce terminals on the ends of the end cells of the battery, connector strips are formed and welded to a channel as shown at 15 in FIG. 5. This channel has already had a heavy nut or lug attached to it which on one end will be the negative pole and on the other, the positive pole for external connection.

(F) Completion:

(1) The battery assembly is completed by connecting the above-prepared end cells to the battery cell pack.

(2) The individual cells are filled with a suitable electrolyte.

(3) The assembled battery is progressively charged until it is operational, i.e., above 80% of maximum capacity.

Thus, the design of the batteries of the present invention, as opposed to the superficially similar structures proposed by prior art such as Artejo (U.S. Pat. No. 3,003,011) and others skilled in the art, permits a unique combination of (A) light weight; (B) large active electrode surface area per unit volume; (C) rapid thermal dissipation without secondary cooling means; and (D) unique assembly processing advantages.

Lighter in weight than the advanced batteries of Artejo because the finger elements of for example the positive electrodes in a given cell, of necessity require more than 50% more metal than similar elements of the instant invention.

This design provides much more active surface area per electrode than that of one of the Artejo structures for electrodes of the instant invention have porous coatings on both sides of material with vast internal surface area as opposed to the electrochemical pastes of the Artejo type structure whose active surface area is limited to that paste area exposed under the metal perforations.

The thin, porous coated single metal sheet electrodes possessing the greatly enhanced active surface area and the folded configuration in the bipolar design of the instant invention, allow large ampere-hour capacity batteries to be constructed compactly, i.e., of very narrow width. This permits rapid dissipation of the internally current-generated thermal energy via primarily the end plates to the outer casing without the necessity of a secondary cooling means.

Finally, the folded, dual leafed electrode design permits ease of construction and intimate placement of initially adjacent electrodes of similar polarity not heretofore realized for, as noted before, one leaf can be positioned as close as desirable to its neighbor while the other can be temporarily unfolded to allow entry of spot welding equipment which will attach the base channel to the end plate. At the completion of this operation the leaf can be placed back into its folded or normal position perpendicular to the end plate to serve as a guide to the placement of, for example, the next dual folded electrode which will be attached in like manner.

To reiterate, whereas in the foregoing, reference has been made to the use of porous sintered nickel, as the structural base, or plaque, which is impregnated, it is to be understood that, though this construction is required in the production of nickel-cadmium batteries, in the case of other types of alkaline cells, use of another porous metal may prove feasible, in at least one electrode.

These and other changes could prove to have utility and, therefore, while what has been described sets forth what is considered to comprise a preferred embodiment, together with certain alternate forms of the invention, other modifications will occur to those skilled in the art, and it is intended to cover in the appended claims all such modifications as fall within the true spirit and scope of the invention.

What is claimed is:

1. A bipolar, extended surface alkaline battery comprising:

(A) barrier plates;
(B) dual porous electrode plates;
(C) separators;
(D) enclosure/supporting frames;
(E) externally accessible terminal means;
(F) externally accessible filling and/or venting means; and
(G) electrolyte wherein
said barrier plates have rims and are composed of nickel or nickel-plated steel;
said dual porous electrode plates are composed of flexible rectangular nickel or nickel plated steel strips having perforated areas at each end which have been coated with a plaque of porous nickel; one half of said plates having said porous plaque impregnated with active materials adapted to confer positive electrode polarity and the other half of said plates having said porous plaque impregnated with active materials adapted to confer negative electrode polarity, said plates being folded in half to form dual-leaf electrode pairs with "U" shaped channel base, each leaf being enclosed in said separator;
said separator being an envelope-shaped, ion-permeable sheet;

said enclosure/supporting frames being rectangularly shaped, four-sided plastic forms whose edges contain means for sequentially connecting one frame to another, one set of edges per frame having means for connecting said barrier plate, said frame having said externally accessible filling and/or venting means positioned so as to be above said electrolyte level;

whereby internal subassemblies are composed of a number of said dual-leafed positive electrodes permanently affixed to one side of said barrier plates with an equal number of dual-leafed negative electrodes permanently affixed to the opposite side of said barrier plates secured at one of the mating edges of at least one of said frames;

two terminal assemblies, one positive and one negative are composed of said negative dual-leafed electrodes permanently affixed to one side of said barrier plate and conductor strips with said externally accessible terminal means permanently affixed to the opposite side of said barrier in the case of a negative terminal assembly, said positive dual-leafed electrodes being used with positive terminal assemblies; said barrier plates secured on the edge outermost the battery of said frames whereby said battery is composed of a stack of said internal subassemblies assembled with electrodes of opposite polarity in interleafed relationship and said positive terminal assembly attached at one end of said stack with said negative terminal assembly attached at the other end of said stack;

said battery containing sufficient electrolyte to effectively produce an electrical potential between said externally accessible positive and negative terminal means.

2. The storage battery of claim 1 wherein said porous nickel plaque is prepared by sintering carbonyl nickel powder.

3. The storage battery of claim 1 wherein the leading edge of said porous nickel plaque is tapered.

4. The storage battery of claim 3 wherein said tapered leading edge is preceded by a non-perforated non-coated metal edge.

5. The storage battery of claim 1 wherein said active material adapted to confer negative electrode polarity is cadmium hydroxide and said active material adapted to confer positive electrode polarity is nickel hydroxide.

6. The storage battery of claim 1 wherein said frames are of nylon with tongue and groove design sealed with a suitable sealant.

7. The storage battery of claim 1 wherein said frames are composed of an ethylene-propylene copolymer, heat sealable plastic.

8. The storage battery of claim 1 wherein the barriers in said internal subassemblies are provided with a small hole, above said electrolyte level for pressure equalization.

9. The storage battery of claim 1 wherein said enclosure/supporting frames have one set of outermost edges that are of opposite interlocking relationship to that of the other set to ensure leak proof frame to frame joining, the female edge having an additional internal groove to accept said rims of said barrier plates.

10. The storage battery of claim 1 wherein said dual-leaf electrode pairs are welded to said barrier plates at said "U" shaped channel base.

* * * * *